United States Patent [19]

Ho

[11] Patent Number: 4,907,618

[45] Date of Patent: Mar. 13, 1990

[54] DISPENSER FOR IRRIGATION CHEMICALS

[76] Inventor: I-Chung Ho, 6958 Grovespring Dr., Rancho Palos Verdes, Calif. 90274

[21] Appl. No.: 313,616

[22] Filed: Feb. 21, 1989

Related U.S. Application Data

[63] Continuation-in-part of Ser. No. 215,741, Jul. 6, 1988.

[51] Int. Cl.[4] .............................................. A01C 23/00
[52] U.S. Cl. ..................................... 137/268; 422/282; 222/310
[58] Field of Search ............................. 137/268, 205.5; 422/261, 281, 282; 239/310; 215/250, 252

[56] References Cited

U.S. PATENT DOCUMENTS

| | | | |
|---|---|---|---|
| 2,889,995 | 6/1959 | Borell | 137/205.5 X |
| 3,123,253 | 3/1964 | Lambton | 137/268 X |
| 3,194,444 | 7/1965 | Hubert | 137/205.5 X |
| 3,455,054 | 7/1969 | Tibbals | 137/205.5 X |
| 3,474,817 | 10/1969 | Bates | 137/268 |
| 4,625,875 | 12/1986 | Carr | 215/252 X |
| 4,795,043 | 1/1989 | Odet | 215/252 X |

*Primary Examiner*—Alan Cohan

[57] ABSTRACT

Beneficial chemicals and water are dispensed by an irrigation system to vegetation served thereby. The irrigation system includes a water flow path in part defined by a housing of the inventive irrigation chemical dispenser. The dispenser housing includes a single-use disposable and replaceable chambered cartridge holding a premeasured supply of chemical material. The cartridge is sealingly closed by a penetrable diaphragm prior to and after its uniting with the remainder of the dispenser housing. Penetrating means are included by the dispenser for receiving momentum from the flow of water through the housing to penetrate the cartridge diaphragm. The chemical material is then communicated to the flow path for dispensing to the vegetation served by the irrigation system.

18 Claims, 3 Drawing Sheets

SEC. B - B

SEC. 3-3

DISPENSER FOR IRRIGATION CHEMICALS

CROSS REFERENCE TO RELATED APPLICATION

The present application is a continuation-in-part of my previous application Ser. No. 07/215,741, entitled, "Irrigation Chemical Dispenser", filed July 6, 1988.

BACKGROUND OF THE INVENTION

The present invention relates to a dispenser for irrigation chemicals. More particularly, the present invention relates to a dispenser for providing water soluble or water-borne chemicals via an irrigation system to the vegetation served thereby.

A conventional dispenser for irrigation chemicals is known wherein a cup-like canister is provided which communicates with a water supply pipe of an irrigation system. A single compressed pellet of chemical material is placed into the cup-like canister. When the irrigation system operates, the water flow through the pipe is in part diverted through the canister and carries the chemical material to the vegetation by dissolving or eroding the pellet of chemical material.

While this known conventional irrigation chemical dispenser is inexpensive and simple in construction and use, it also suffers from several deficiencies. For example, because the pellet of chemical material to be inserted into the cup-like canister is available in one size only, the quantity of chemical material dispensed cannot be proportioned according to the area of vegetation or number of plants served by the irrigation system. Possibly, a user of such a dispenser may attain a rough approximation of such proportioning by breaking the pellets into fractions for an irrigation system serving a small vegetation area, or providing multiple dispensers in a system serving a large vegetation area. However, both of these expedients are undesirable, and are inconvenient or expensive.

This known canister-type chemical dispenser is limited in its use to chemicals of solid form which can be compressed into the single pellet for inserting into the canister. While a variety of such pellets are available for grasses, evergreens, roses, etc., the conventional canister-type dispenser cannot use irrigation chemicals of liquid, paste, powder, or granular form.

Another conventional irrigation chemical dispenser is known in accord with U.S. Pat. No. 4,558,715. This teaching is believed to provide a dispenser wherein a drive piston is reciprocated by flowing water under control of a valve device. The drive piston, by its reciprocation, causes reciprocation also of a metering piston. The metering piston draws a selected liquid irrigation chemical from a source thereof and injects the liquid chemical into the water flow downstream of the drive piston.

Unfortunately, the device taught by the '715 patent is both somewhat complex in its construction, and expensive. This device controls the flow of liquid irrigation chemical as a percentage of the total water flow. Such precise control of the percentage of irrigation chemical is believed not to be necessary for an irrigation system to successfully meet the needs of the vegetation served thereby. All that need be effected, in contrast, is control of the total quantity of chemical material dispensed according to the vegetation area or number of plants served by the irrigation system. The device according to the '715 patent is further limited to use of liquid irrigation chemicals.

SUMMARY OF THE INVENTION

In view of the deficiencies of the conventional irrigation chemical dispensers pointed out above, it is an object for the present invention to provide a dispenser for irrigation chemicals which is simple and inexpensive in its construction, which presents only a minimal resistance to water flow therethrough, and which is very positive in its action to open an irrigation chemical cartridge provided with a penetrable diaphragm through which the irrigation chemical stored therein is accessible. Another object for the present invention is to provide a dispenser for irrigation chemicals including a single-use disposable cartridge holding a premeasured quantity of selected irrigation chemical, which cartridge is sealed by a penetrable diaphragm prior to and after its insertion into the dispenser of the present invention.

Still another object for the present invention is to provide an irrigation chemical dispenser allowing simple, convenient, and safe handling of the irrigation chemical by maintaining the chemical in a sealingly closed cartridge until a dispensing flow of water is employed to open the cartridge.

Yet another object for this invention is to provide an irrigation chemical dispenser which includes an optional antisiphon feature which will serve to satisfy the local plumbing codes in many areas without the need for a separate antisiphon valve.

Still another object for this invention is to allow for the possibility of integrating the water shut off control valve and the antisiphon feature into one single compact dispenser and control unit.

Another object for this invention is to provide a dispenser for irrigation chemicals of the above-described character wherein a sealed cartridge of irrigation chemical is joined with the dispenser while remaining sealed, and is automatically and positively opened and dispensed by the dispenser upon the onset of water flow in the irrigation system including the dispenser.

Additional objects and advantages of the present invention will be apparent from a reading of the following detailed description of a particularly preferred embodiment of the invention, taken in conjunction with the appended drawing figures, in which:

BRIEF DESCRIPTION OF THE DRAWING FIGURES

FIGS. 1 and 2 in conjunction provide respective elevation views, each taken generally along the referenced plane of the other of these two figures, showing parts of the apparatus in alternative operative positions, and each partially in cross section, of an irrigation chemical dispenser embodying the present invention;

FIG. 3 provides a plan view of the irrigation chemical dispenser seen in FIG. 1, partially in cross section taken generally along the line 3—3 of FIG. 2, and having parts thereof omitted for clarity of illustration.

DETAILED DESCRIPTION OF THE PREFERRED EMBODIMENT OF THE INVENTION

Figure 1:
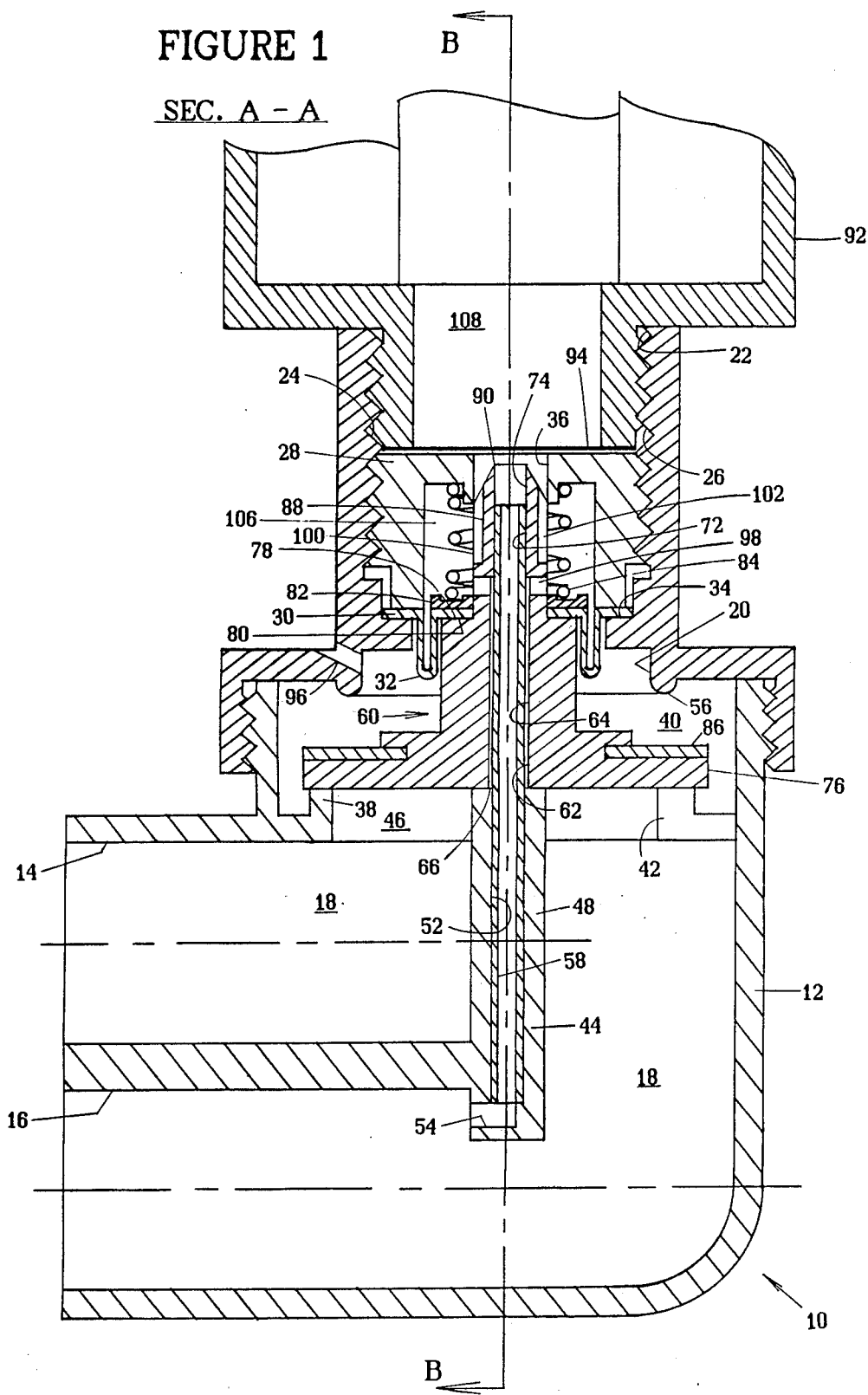
Figure 2:
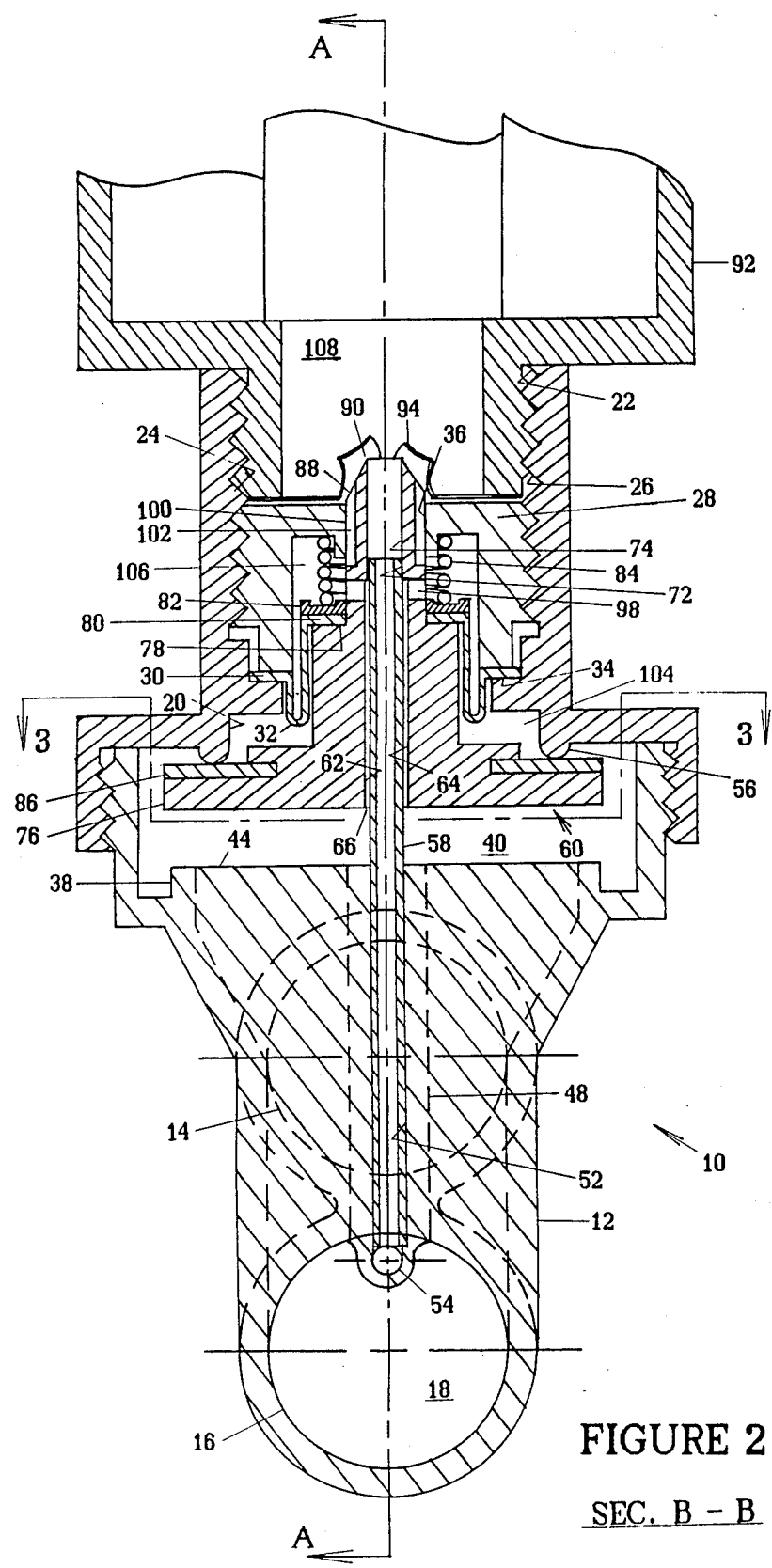
Figure 3:
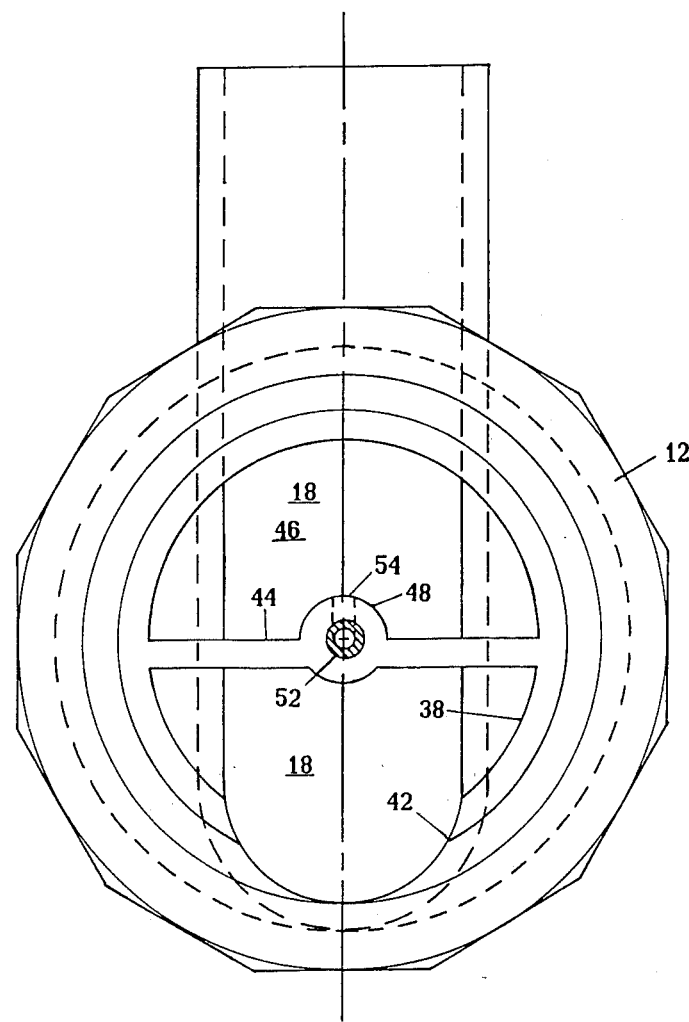

FIGS. 1, 2 and 3, respectively depict cross sectional elevation views, and a cross sectional fragmentary plan view of a dispenser 10 for irrigation chemicals according to a preferred embodiment of the invention. The dispenser 10 includes a housing 12 defining an inlet port, generally referenced with the numeral 14, and an outlet port generally referenced with the numeral 16. The housing 12 also defines a flow path 18 communicating between inlet port 14 and outlet port 16.

The dispenser housing 12 defines a stepped bore generally referenced with the numeral 20, and extending from the flow path 18 to open outwardly on the housing 12 at 22. An outer portion 24 of the bore 20 defines a thread 26. An annular member 28 is threadably received in the bore 20 and sealingly traps an outer marginal portion 30 of a flexible rolling-diaphragm type of sealing member 32 against a step 34 on the bore 20. The annular member 28 also defines an axially extending stepped through guide bore 36, which is coaxial with the bore 20.

Viewing FIG. 3, it will be seen that the housing 12 defines a radially inwardly and axially extending rib 38. The rib 38 extends partially circumferentially around and confronts a chamber 40 defined within the housing 12. A circumferentially extending gap 42 in the rib 38 also extends axially to continuously communicate the chamber 40 with the flow path 18 downstream thereof. A partition portion 44 of the housing 12 transects the rib 38 to cooperatively define a generally crescent-shaped port 46 communicating with the inlet 14 and opening upwardly into the chamber 40 (viewing particularly FIG. 3). A small diameter bore 52 coaxial with the bore 20 extends downwardly within the partition portion 44, and communicates with the flow path 18 downstream of the chamber 40 via an opening 54 facing in the downstream direction. That is, the opening 54 faces outlet 16.

In order to complete this part of the description of FIGS. 1-3, it must be noted that the housing 12 also defines a circumferentially continuous lip 56 spaced from and comfronting the rib 38 as well as extending into the chamber 40. Also, a small diameter corrosion-resistant guide tube 58 is press fitted into the bore 52 and extends upwardly of the partition portion 44 nearly to the upper smaller diameter part of guide bore 36 in the annular member 28.

A multifunction plunger member 60 is movably received in the chamber 40 and in stepped bore 20. Particularly, the plunger member 60 defines a stepped through bore generally referenced with the numeral 62, and having two bore portions of differing and successively smaller diameters from bottom to top, as seen viewing the Figures. The plunger member 60 is slidably received upon the corrosion-resistant guide tube 58, in the chamber 40 and bore 20 and guide bore 36. Referring once again to the stepped through bore 62, the latter includes a lower larger diameter or metering portion 64 cooperating with the corrosion-resistant guide tube to define therewith an axially extending radial metering clearance 66. Above the bore portion 64, the stepped bore 62 includes a comparatively smaller diameter or flow restricting portion 72. The tube 58 is slidably received in the bore portion 72 to define therewith a radial clearance (not depicted on the drawing Figures) sufficient to allow relative movement of the plumger member 60 on tube 58, but sufficiently tight also as to inhibit or restrict axial flow of water therethrough. Finally, above the bore portion 72 the stepped bore 62 includes a bore portion 74 opening upwardly through the plunger member 60 above the upper end of the guide tube 58. The bore portion 74 may be substantially the same diameter as the bore portion 72.

The plunger member 60 also includes a radially outwardly extending disk-like portion 76 which is captively received in the chamber 40 between the rib 38 and the lip 56. Spaced above the disk-like portion 76, the plunger member 60 includes a radially outwardly extending shoulder 78. An inner marginal edge portion 80 of the annular sealing member 32 sealingly engages the shoulder 78. It will be seen viewing FIGS. 1 and 2 that an annular spring seat 82 rests upon the inner marginal edge portion 80, and insures sealing engagement of the latter with the shoulder 78 because of the bias of a coil compression spring 84. The spring 84 extends from the spring seat 82 to the annular member 28, to engage the latter immediately below the upper smaller diameter portion of guide bore 36. Because of the bias of spring 84, the disk-like portion 76 is urged into engagement with the rib 38, which supports the latter, and results in the port 46 being substantially closed thereby.

In order to complete this description of the structure of dispenser 10, it must be noted that the upper face of the disk-like portion 76 carries an annular sealing member 86, which in a first position of the plunger member 60 (depicted in FIG. 1) is spaced from and confronts the lip 56. Also, the plunger member 60 defines an elongate axially extending penetrator portion 88 terminating in a sharp point 90 confronting the outer portion 24 of bore 20.

A cartridge 92 of irrigation chemical (only a fragmentary portion of which is depicted, viewing FIGS. 1 and 2) which is sealed by a penetrable diaphragm 94 is threadably receivable in the outer portion 24 of the bore 20. When received into the bore 20 in operative cooperation with the housing 12, the diaphragm 94 is disposed immediately above the annular member 28 in confronting relation with the point 90 of penetrator portion 88. The diaphragm 94 is of a nonelastic yieldably shape-retaining character such that it may be nonsealingly penetrated by the penetrator portion 88. That is, the diaphragm preferably is of a type which is nonelastic, which tears when penetrated, but which does not tear in such a way as to create a fragment which might clog a small passage of the dispenser. The applicant believes a diaphragm of laminated polymer and metallic foil will fulfill all of the requirements for the present invention. However, the nature of the diaphragm, as described above, is more important to successful operation of the invention, the Inventor believes, than the material from which the diaphragm is made.

An optional passage 96 communicates outwardly of the chamber 40 within the lip 56 to open externally to ambient on the housing 12. This passage, as will be seen, allows the dispenser 10 to also function as an antisiphon valve. In the event such antisiphon function is not desired, the passage 96, along with the sealing member 32 may be omitted without otherwise altering the operation of the dispenser 10.

Finally, it should be noted that a small passage 98 opens laterally through the penetrator portion 88 at the upper termination of the larger diameter bore portion 62 and metering clearance 66 immediately adjacent the bore part 72 to communicate the clearance 66 with a lateral surface 100 of the penetrator portion 88 spaced from point 90. It must also be noted that the penetrator portion 88 of the plunger member 60 defines at the lateral surface 100 at least one axially extending groove 12. The groove extends upwardly from the opening of passage 98 and onto the point 90.

Having observed the structure of the dispenser 10, attention may now be directed to its method of operation. Viewing the drawing Figures again, it will be seen that when a flow of water is admitted to the housing 12 via the inlet port 14, this water flow will be directed by port 46 generally upwardly at the disk-like portion 76 of the plunger member 60. In other words, the port 46 establishes a direction for the flow of water which is parallel with and in the direction of possible movement of the plunger member 60. At the same time, the disk-like portion 76 presents a bluff surface or abutment against which the inflow of water is directed. As a result, the inflow of water undergoes a deflection or change of direction of about ninety degrees so that a portion of the water's momentum is imparted to the plumger member 60. The result is a strong upwardly directed force effective on the plumger member 60 to move the latter upwardly from its first position as depicted in FIG. 1 toward a second position therefor as shown in FIG. 2 in opposition to the bias of spring 84.

Consequently to the above, several events occur simultaneously with upward movement of the plunger member 60. The disk-like portion 76 moves across chamber 40 to sealingly engage the sealing member 86 with the lip 56, and to establish a sub-chamber 104 (viewing FIG. 2) radially within this lip. That is, the sub-chamber 104 is a part of chamber 40 separated from the remainder thereof in the second position of the plunger member 60. The optional passage 96 communicates sub-chamber 104 with ambient. At the same time, the chamber 40 below disk-like portion 76 is sealingly separate from ambient and communicates inlet port 14 with outlet port 16 via the port 46 and flow path 18.

The penetrator portion 88 of the plunger member 60 is driven upwardly to nonsealingly penetrate the diaphragm 94 of the irrigation chemical cartridge 92. That is, recalling the description above, the lateral surface 100 of the penetrator portion 88 is grooved or fluted to insure it does not sealingly engage the diaphragm 94 upon penetrating the latter. Also, the diaphragm 94 is of such a nature that it does not of its own nature tend to sealingly engage the penetrator portion 88. Preferably, the diaphragm portion 94 is defined by a comparatively thin and tearable metallic foil, or by a metallic foil laminated with a thin layer of polymer. The small passage 98 communicates the metering clearance 66 with a chamber 106 defined annularly around the penetrator portion 88. The point 90 of the penetrator portion 88 is disposed within the irrigation chemical cartridge 92 so that the bore 62 opens to a chamber 108 therein via the portion 74 thereof.

With the plunger member 60 in its second postion, water flows in a relatively small quantity from flow path 18 axially upwardly in the metering clearance 66 defined between bore portion 64 and the corrosion-resistant guide tube 58. This metered water flow is discharged into the interior chamber 108 of the irrigation chemical cartridge via the lateral passage 98 and chamber 106, flowing between the diaphragm 94 and the lateral surface 100 of the penetrator portion 88, particularly recalling the nonsealing relation of the latter with the diaphragm 94, and the grooves 102.

Concurrently, the water flow in flow path 18 passes the outlet 54 of the bore 52 to result in an extractor effect. That is, a comparatively low pressure is created at the outlet 54, and is communicated upwardly through the upper portion 74 via the tube 58. Because the tube 58 still remains received in the bore portion 72 in the second positon of the plunger member 60, only a very small leakage flow of water passes axially from metering clearance 66 through the flow restricting bore portion 72 to be aspirated into tube 58. That is, the upward axial movement of the plunger member 60 between its first position and second position is less than the length of extension of tube 58 into flow restricting bore portion 72. Thus, in the second position of the plunger member 60 the tube 58 somewhat sealingly cooperates with the bore portion 72 to separate a flow path metering water into cartridge 92 from a return flow path including bore portions 74, the part of bore portion 72 above the tube 58, and the interior passage of tube 58 leading to opening 54.

In view of the above, water flows into the cartridge 92 to mix with or dissolve irrigation chemical therefrom, and is returned to the flow path 18 via the upper portions 72 and 74 of bore 62, along with the tube 58. In the manner described immediately above, the dispenser 10 opens a cartridge of irrigation chemical disposed in association therewith, and dispenses the water-soluble or water dispersable contents of the cartridge to the vegetation served by an associated irrigation system.

At the completion of an irrigation cycle, the water flow in flow path 18 ceases. Consequently, the spring 84 returns the plunger member 60 to its first position as depicted in FIG. 1. Because the disk-like portion 76 once again rests upon the rib 38, the flow path 18 up stream of the disk-like portion is substantially sealingly separated from the chamber 40. On the other hand, the optional passage 96 communicates the chamber 40 and the flow path 18 down stream of the disk-like portion with ambient. Thus, in the event a sub-ambient pressure is imposed upon the inlet port 14, water cannot be drawn back to the inlet from the irrigation system. This feature of the irrigation dispenser 10 will satisfy the plumbing codes of most locales which require a siphon breaker valve for irrigation systems.

While the present invention has been depicted and described by reference to a particularly preferred embodiment thereof, no limitation of the invention is implied by such reference, and none is to be inferred. The invention is intended to be limited only by the spirit and scope of the appended claims, which provide additional definition of the invention. Many alterations and modifications of the invention will suggest themselves to those skilled in the pertinent art. For example, it is apparent that the embodiment of FIGS. 1-3 may include a solenoid operated water flow control valve. Alternatively, the penetrator member may be driven by a solenoid. In this way both the providing of irrigation water and the dispensing of irrigation chemicals along with the water flow may be controlled independently by a conventional irrigation timer in conjunction with the dispenser of the present invention. Also, the water flow path to and from the irrigation chemical cartridge may be defined in part by the penetrator member and in part by the housing alone. That is, the penetrator may define the water flow path to the cartridge chamber, while a return flow path from the cartridge chamber for communicating water mixed with irrigation chemical is defined by a passage in the housing apart from the penetrator member.

Further to the above, those skilled in the pertinent art will recognize that the dispenser 10 presents almost all of the elements necessary to itself operate as a water flow control valve. In other words, if the sealing member 32 is considered to define a water pressure responsive piston in conjunction with the plunger member 60, and a normally closed solenoid-operated pilot valve is provided between the upper opening of tube 58 and the opening 54, the dispenser 10 will function as an integrated water flow control valve and dispenser for irrigation chemical. A valve device of the above-described character is dislosed by U.S. Pat. No. 4,505,450. Upon a review of this patent, it will be apparent that the present dispenser for irrigation chemical can function as such a water flow control valve if, in addition to the modifications suggested above, the disk portion of the penetrator member is provided with a sealing member confronting the inlet port in order to sealingly close the flow path.

I claim:

1. A dispenser for irrigation chemicals comprising: a housing defining an inlet, an outlet, and a first flow path extending between said inlet and said outlet for communicating a flow of irrigating water therebetween, said housing defining bore means opening from said first flow path outwardly thereon for sealingly and removably receiving a chambered cartridge of irrigation chemical, which cartridge includes a penetrable diaphragm sealingly closing said cartridge chamber within said housing bore means, a plunger member reciprocably received in said bore means and movable between a first position spaced from the diaphragm of said cartridge and closing said first flow path and a second position bounding said first flow path and penetrating said diaphragm, said housing and said plunger member cooperating in said second position of the latter to define both a second flow path for water flow from said first flow path to the chamber of said cartridge and a third flow path for flow of water and irrigation chemical from said cartridge chamber to said first flow path, said plunger member including moving means for in response to said flow of irrigating water in said first flow path moving forcefully from said first position to said second position to penetrate said diaphragm member.

2. The invention of claim 1 further including said housing and said plunger member cooperating to define means for metering water flow through said second flow path to said cartridge chamber.

3. The invention of claim 1 wherein said moving means includes said plunger member defining a disk-like portion confronting water flow from said inlet port in said first flow path.

4. The invention of claim 3 wherein said housing additionally defines a port forming a part of said first flow path and directing said flow of water from said inlet port in a selected direction substantially parallel with movement of said plunger member between said first and said second positions, and said plunger member defining a bluff surface at said disk-like portion confronting said water flowing in said selected direction.

5. The invention of claim 4 wherein said housing includes a chamber communicating with both said inlet port and said outlet port to form a part of said first flow path, said bore means opening outwardly of said housing from said chamber, said plunger member disk-like portion being movable in said housing chamber.

6. The invention of claim 5 wherein said housing defines said port intermediate said inlet port and said chamber and opening to the latter, said disk-like portion of said plunger member in said first position of the latter spanning said port to substantially close said first flow path.

7. The invention of claim 6 wherein said housing includes a partition portion separating said port from said flow path downstream of said chamber, a guide member extending from said partition portion coaxially of said bore means toward the opening thereof, said plunger member defining a stepped through bore reciprocably receiving said guide member and cooperating therewith to define a part of said second flow path.

8. The invention of claim 7 wherein said plunger member cooperates at a selected metering part of said stepped through bore thereof with said guide member to define a radial clearance extending axially thereof and defining a metering portion of said second flow path.

9. The invention of claim 8 wherein said guide member includes an elongate tube coaxial with said bore means, said plunger member movably but fluid-flow restrictively cooperates with said tube at a second part of said stepped through bore.

10. The invention of claim 9 wherein said first-recited metering bore part of said stepped through bore is disposed immediately adjacent to said chamber, said second bore part being disposed immediately adjacent to said metering bore part and spaced toward said opening of said housing bore.

11. The invention of claim 10 wherein said plunger member includes also a transverse passage opening from said metering bore part immediately adjacent said second bore part and onto a lateral outer surface of said plunger member.

12. The invention of claim 11 further including said plunger member having a penetrator portion disposed toward said opening of said housing bore means, said penetrator portion confronting said diaphragm member in said first position of said plunger member and defining said lateral outer surface of said plunger member.

13. The invention of claim 3 wherein said disk-like portion of said plunger member carries a sealing member disposed away from said port, said housing defining a circumferentially continuous lip extending into said chamber and circumscribing said housing bore means, said sealing member sealingly engaging said lip in said second position of said plunger member.

14. The invention of claim 13 wherein said disk-like portion cooperates with said housing in said second position of said plunger member to separate a sub-chamber portion of said chamber within said lip from the remainder of said chamber, said housing defining a passage opening outwardly from said sub-chamber to ambient.

15. A dispenser for irrigation chemicals comprising: a housing defining an inlet, an outlet, and a flow path extending from said inlet to said outlet for communicating a flow of water therebetween, said housing including a port intermediate said inlet and said outlet and defining a part of said flow path for determining a water flow direction thereat, a bore opening outwardly upon said housing substantially parallel with said determined water flow direction, a plunger member disposed in said bore and movable substantially parallel to said determined water flow direction between a first positon adjacent said port and a second position spaced therefrom, said plunger member defining both a bluff surface disposed toward said port and a penetrator portion disposed outwardly of said bore, a chambered cartridge member for receiving therein a store of water-dispersable irrigation chemical removably and sealingly received in said bore, said cartridge member defining an opening from said chamber thereof within said housing bore, said cartridge member further carrying a penetrable diaphragm member closing said cartridge opening within said bore, penetrating means carried by said plunger member for penetrating said diaphragm member upon movement of said plunger member from said first position to said second position thereof, passage means for communicating water from said flow path to said cartridge member chamber and for communicating water mixed with said water-dispersable irrigation chemical to said flow path, and aspirator means associated with said passage means for causing a flow of fluid in the latter in response to water flow in said flow path, whereby said water flow in said determined direction imparts momentum to said plunger member to forcefully move the latter from said first position to said second position to open and dispense the contents of said irrigation chemical cartridge.

16. The invention of claim 15 wherein said penetrating means includes said plunger member defining a penetrating portion sealingly and reciprocably received in said bore, said penetrating portion being outwardly configured to nonsealingly penetrate said diaphragm member.

17. The method of selectively providing beneficial chemical material to vegetation served by an irrigation system which includes a conduit defining a flow path wherein flows water to said vegetation, said method including the steps of: providing a dispenser for irrigation chemicals having a housing, utilizing said housing to define a portion of said flow path, providing a chambered cartridge member including a penetrable diaphragm portion closing an opening to the chamber thereof, utilizing said dispenser housing and said cartridge member to cooperatively define a cavity bounded by said diaphragm portion, disposing a quantity of selected chemical material within the chamber of said cartridge member, providing penetrating means carried by said dispenser housing for penetrating said diaphragm portion to communicate said cartridge chamber with said cavity, communicating said cavity with said flow path, and imparting momentum from said flow of water to said penetrating means to effect said penetration of said diaphragm.

18. The method of claim 17 wherein said step of providing penetrating means for penetrating said diaphragm member includes the steps of providing a stepped bore in said housing, movingly and sealingly disposing a penetrator member in said housing bore, utilizing said penetrater member to cooperate with said housing and said diaphragm member to bound said cavity on one side of said penetrator member and to bound on the opposite side of said penetrator member another cavity, expanding and contracting said cavity and said another cavity in opposition in response to movement of said penetrator member, providing on said penetrator member an elongate needle-like portion extending toward said diaphragm member, defining externally on said needle-like portion a fluted or grooved outer surface in said cavity and internally thereof an elongate through bore communicating with said another cavity and extending therethrough to said cavity, and communicating said another cavity with said flow path.

* * * * *